(12) United States Patent
Tokutome et al.

(10) Patent No.: US 11,414,304 B2
(45) Date of Patent: Aug. 16, 2022

(54) BOOM SLEWING ANGLE DETECTION DEVICE FOR MOBILE CRANE

(71) Applicant: MAEDA SEISAKUSHO CO., LTD., Nagano (JP)

(72) Inventors: Shinya Tokutome, Nagano (JP); Mitsuaki Wada, Nagano (JP); Takahisa Karasawa, Nagano (JP)

(73) Assignee: MAEDA SEISAKUSHO CO., LTD., Nagano (JP)

( * ) Notice: Subject to any disclaimer, the term of this patent is extended or adjusted under 35 U.S.C. 154(b) by 316 days.

(21) Appl. No.: 16/759,861

(22) PCT Filed: Dec. 14, 2017

(86) PCT No.: PCT/JP2017/044994
§ 371 (c)(1),
(2) Date: Apr. 28, 2020

(87) PCT Pub. No.: WO2019/116522
PCT Pub. Date: Jun. 20, 2019

(65) Prior Publication Data
US 2020/0331729 A1 Oct. 22, 2020

(51) Int. Cl.
*B66C 13/00* (2006.01)
*B66C 13/16* (2006.01)
(Continued)

(52) U.S. Cl.
CPC .............. *B66C 13/16* (2013.01); *B66C 13/46* (2013.01); *G01D 5/342* (2013.01); *G01D 5/36* (2013.01)

(58) Field of Classification Search
CPC .......... B66C 13/16; B66C 13/46; G01D 5/18; G01D 5/342; G01D 5/36
See application file for complete search history.

(56) References Cited

U.S. PATENT DOCUMENTS

| 10,605,623 B1* | 3/2020 | Mourlam | G01D 5/04 |
| 2011/0006025 A1* | 1/2011 | Schneider | B66C 13/063 |
| | | | 212/284 |

(Continued)

FOREIGN PATENT DOCUMENTS

| CN | 102793992 A | 11/2012 |
| JP | S5675384 A | 6/1981 |

(Continued)

OTHER PUBLICATIONS

International Search Report (PCT/ISA/210) dated Mar. 6, 2018, by the Japanese Patent Office as the International Searching Authority for International Application No. PCT/JP2017/044994.

(Continued)

*Primary Examiner* — Emmanuel M Marcelo
(74) *Attorney, Agent, or Firm* — Buchanan Ingersoll & Rooney PC

(57) ABSTRACT

In this boom slewing angle detection device, a slewing angle detecting gear is attached to an end of a shaft of a pinion gear that meshes with a ring gear formed on a slewing bearing rotatably supporting a crane boom, and the amount of rotation of the slewing angle detecting gear is detected by a slewing-angle-detecting proximity sensor. The slewing angle detecting gear is not meshed with the ring gear or the pinion gear, which compose a slewing force transmission mechanism; thus, grease, and the like, do not adhere to the slewing angle detecting gear, and external teeth for detection of the slewing angle detecting gear are not subject to wear, so accurate slewing angle detection is possible.

1 Claim, 3 Drawing Sheets

(51) Int. Cl.
*B66C 13/46* (2006.01)
*G01D 5/34* (2006.01)
*G01D 5/36* (2006.01)

(56) References Cited

U.S. PATENT DOCUMENTS

| 2015/0249821 A1* | 9/2015 | Tanizumi | B66C 13/46 348/46 |
| 2021/0300731 A1* | 9/2021 | Matsushita | B66C 13/00 |

FOREIGN PATENT DOCUMENTS

| JP | H0674751 A | 3/1994 |
| JP | H09142789 A | 6/1997 |
| JP | 2002235499 A | 8/2002 |
| JP | 2007176650 A | 7/2007 |

OTHER PUBLICATIONS

Written Opinion (PCT/ISA/237) dated Mar. 6, 2018, by the Japanese Patent Office as the International Searching Authority for International Application No. PCT/JP2017/044994.

* cited by examiner

BOOM SLEWING ANGLE DETECTION DEVICE FOR MOBILE CRANE

TECHNICAL FIELD

The present invention relates to a crawler crane or other mobile crane and in particular to a boom slewing angle detection device to detect a slewing angle of a crane boom.

BACKGROUND ART

A mobile crane such as a crawler crane is provided with a safety device. A safety device prevents overturning et al of a crane by means of forcibly and automatically stopping the crane work when a condition of crane work exceeds a safety working area. The stability of a crane differs depending on the slewing angle of the crane boom, and the slewing angle of the crane must therefore be detected in order to make full use of the crane capacity.

A boom slewing angle detection device for a crane is described in Patent documents 1 to 3, for example. In boom slewing angle detection devices described in these Patent documents, a sensor gear is meshed with a ring gear in order to detect an amount of rotation of the ring gear provided to a slewing bearing, the slewing bearing being disposed between a lower traveling body and a boom swivel on which a crane boom is mounted. Alternatively, a proximity sensor is disposed to face a ring gear. A slewing angle of the upper swivel is calculated based on the amount of rotation of the ring gear detected by these sensors. Additionally, in Patent document 1, there are provided a reference projection and a reference-position sensor for detecting the reference projection so that a slewing angle from the reference position is obtained.

PRIOR ART DOCUMENT

Patent Document

Patent document 1: JP H06-74751 A
Patent document 2: JP H09-142789 A
Patent document 3: JP 2007-176650 A

SUMMARY OF THE INVENTION

Problems to be Solved by the Invention

A conventional boom slewing angle detection device has such problems as described below. First, vibration, deflection and other influences applied to a slewing force transmission mechanism directly act on a ring gear, which is a transmission component to transmit slewing force to a boom swivel, or on a sensor gear meshed directly with the ring gear, and the detection accuracy of the device might be deteriorated due to these vibration, deflection et al. Additionally, the sensor gear, which rotates while meshing with the ring gear et al, might be subject to wear, causing detection accuracy of the device to deteriorate.

In a case in which a sensor gear is arranged to mesh with a ring gear, it is necessary to provide a bearing mechanism or other mechanism to support the sensor gear. This causes to increase in the number of component parts and to make the detection mechanism more complicated, and in some cases, installation space cannot be secured.

In addition, in a case in which a proximity sensor is used to detect an amount of rotation of a ring gear or a pinion gear meshing with the ring gear, detection accuracy might be deteriorated due to grease applied to the ring gear, vibration or wear generated in the ring gear, or other factors.

In view of these points, an object of the invention is to provide a boom slewing angle detection device for a mobile crane, which can be constituted by less number of component parts, does not require much installation space and is able to detect a boom slewing angle with high accuracy.

Means of Solving the Problems

In order to solve the above problems, a boom slewing angle detection device for a mobile crane to detect a slewing angle from a slewing storage position of a crane boom according to the present invention, is characterized by having:

a slewing angle detecting gear coaxially attached to a shaft end of a pinion gear so as to integrally rotate therewith, the pinion gear being an output element of a slewing reduction gear at a side of a lower travelling body of the crane, the slewing reduction gear transmitting a slewing force to a ring gear attached to a side of the crane boom;

a slewing-angle-detecting proximity sensor to detect an amount of rotation of the slewing angle detecting gear;

a slewing storage position sensor to detect a slewing storage position of the crane boom; and a controller provided with: a slewing amount calculation part to calculate a slewing amount of the crane boom based on the amount of rotation detected by the slewing-angle-detecting proximity sensor; a slewing angle calculation part to calculate the slewing angle based on the slewing amount; and a slewing-angle zero-point adjustment part to reset the slewing angle to be zero degree when the slewing storage position sensor detects the slewing storage position.

In the present invention, the slewing angle detecting gear is attached to an end of the pinion gear at the side of the lower travelling body to mesh with the ring gear at the side of the crane boom, and the slewing-angle-detecting proximity sensor detects the amount of rotation of the slewing angle detecting gear that integrally rotates with the pinion gear. The slewing angle detecting gear is not meshed with the ring gear or the pinion gear, the ring gear and the pinion gear constituting a slewing force transmission mechanism. Accordingly, the slewing angle detecting gear is prevented from being adhered with grease, wear particles and other foreign matters from the ring gear and the pinion gear. The slewing angle detecting gear is also prevented from being directly applied with vibration, deflection or other influences generated in a slewing force transmission system. Furthermore, detecting portions of external teeth of the slew angle detecting gear is not subject to wear due to meshing.

Therefore, it is possible to avoid adverse effects including degradation in accuracy for detecting the number of external teeth passing through a sensing position, which is caused by adhering of grease and foreign matters to the numerous fine external teeth that are formed on the slewing angle detecting gear and pass through the sensing position of the slewing-angle-detecting proximity sensor. Additionally, it is possible to maintain the distance between the slewing angle detecting gear and the slewing-angle-detecting proximity sensor to be constant, and detect the amount of rotation of the slewing angle detecting gear with high accuracy. Furthermore, the slewing angle detecting gear does not belong to component parts of the slewing force transmission mechanism, the number of external teeth for detection formed therein can be freely determined, making easier to detect the slewing angle of the slewing body with a desired resolution. In addition, the slewing angle detecting gear is attached to an end of the pinion gear that is a component part of the slewing force transmission mechanism. In comparison with a case in which the slewing angle detecting gear is disposed independently at a position by means of bearing mechanism and other mechanism, installation space is not much required and the number of component parts can be reduced.

MODE FOR CARRYING OUT THE INVENTION

An embodiment of a boom slewing angle detection device of a mobile crane to which the present invention is applied is described below with reference to the drawings. The embodiment described below presents one example of the present invention, and the present invention is not limited to the configuration of the embodiment.

Example of Mobile Crane

Figure 1:
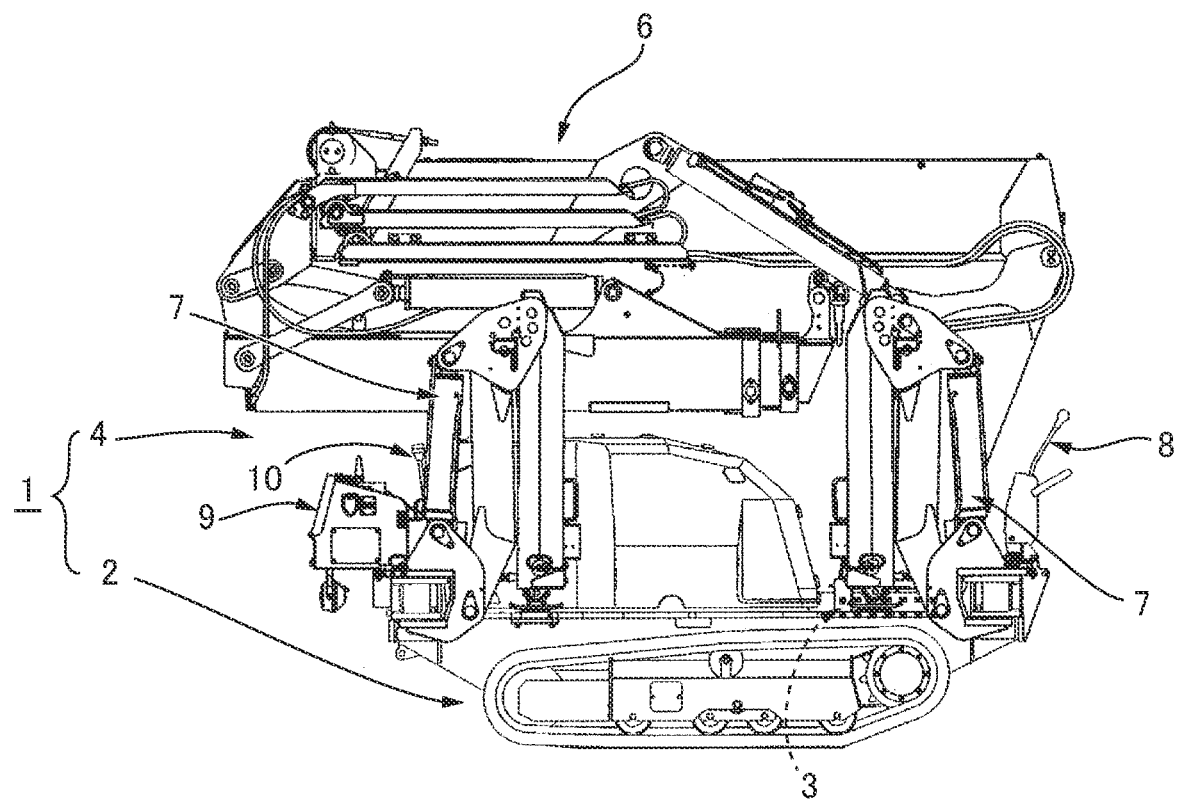
FIG. 1 is a front view of a small-sized mobile crane to which the present invention is applicable.
Figure 2:
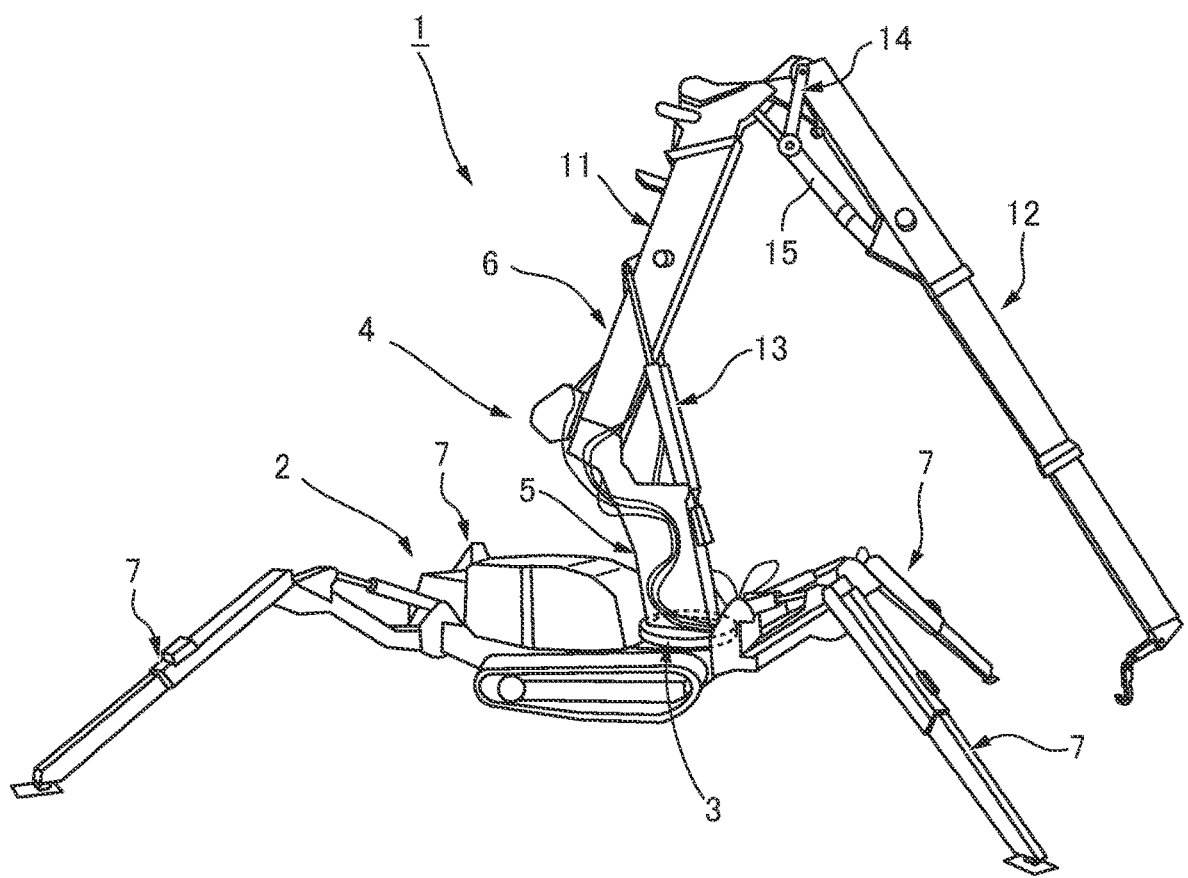
FIG. 2 is an explanatory view of an example of a state of the mobile crane of FIG. 1 during operation.

FIG. 1 is a front view illustrating a small-sized mobile crane according to the present embodiment, and FIG. 2 is an explanatory drawing illustrating an example of a working state of the crane. The mobile crane 1 is provided with a lower traveling body 2 comprising a crawler. An upper slewing body 4 is mounted, via a slewing bearing 3, on the lower traveling body 2. The upper slewing body 4 is provided with a boom swivel 5 supported on the lower traveling body 2 via the slewing bearing 3 so as to be capable of slewing, and a knuckle-boom type crane boom 6 mounted on the boom swivel 5.

The crane boom 6 may of course be a straight boom or other type of boom other than a knuckle-boom type. Four outriggers 7 are attached to the four corners of the lower traveling body 2. A traveling operation lever 8 of the lower traveling body 2 is disposed at one end of the lower traveling body 2, and a control panel 9 and a crane operation lever 10 are mounted at the other end of the lower traveling body 2. Additionally, the mobile crane 1 can be remotely operated by using a radio-controlling operation lever (not shown).

The crane boom 6 includes a first boom 11 and a second boom 12. The first boom 11 slews in a lateral direction about a slewing center of the boom swivel 5 supported by the slewing bearing 3. A pair of rising/falling cylinders 13 span between the boom swivel 5 and the first boom 11, and the first boom 11 is raised and lowered by the extending and contracting of the rising/falling cylinders 13. The distal end part of the first boom 11 and the rear end part of the second boom 12 are linked by a knuckle boom joint mechanism 14. When a cylinder 15 of the knuckle boom joint mechanism 14 is extended or contracted, the second boom 12 can be raised and lowered relative to the first boom 11. The second boom 12 is a multi-stage boom and is capable of extending and contracting in an axial direction thereof.

From the stowed state shown in FIG. 1, the outriggers 7 are caused to turn and overhang so as to face outward, and the lower traveling body 2 is caused to rise off the ground surface. The mobile crane 1 is fixed in a stable state as shown in FIG. 2. In this state, crane work is performed by causing the crane boom 6 to slew laterally from a slew storage position, which is an initial position, and raise and lower, and extended and contracted.

Boom Slewing Angle Detection Device

Figure 3:
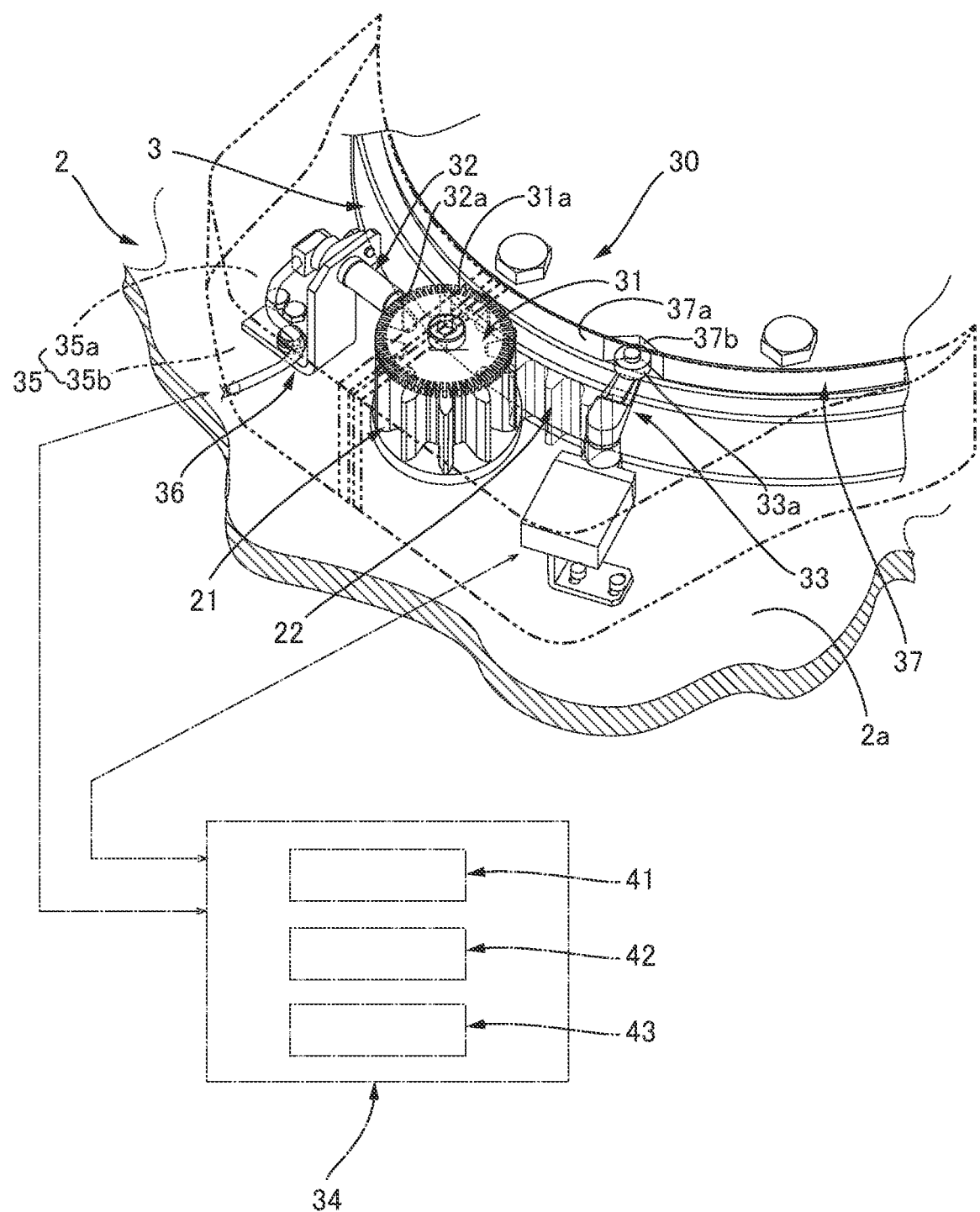
FIG. 3 is an explanatory view illustrating a boom slewing angle detection device assembled in the mobile crane of FIG. 1.

FIG. 3 illustrates an example of a boom slewing angle detection device and component parts of a slewing force transmission mechanism of the crane boom 6, the device and the component parts being incorporated in the mobile crane 1 having the above-mentioned configuration.

The slewing force transmission mechanism, which transmits a slewing force to the crane boom 6, is provided with a not-shown hydraulic motor and a not-shown slewing reduction gear mounted on the lower traveling body 2, in which the slewing reduction gear reduces the speed of rotational force of the hydraulic motor and transmits the reduced-speed rotational force to the boom swivel 5 supporting the crane boom 6. FIG. 3 illustrates a pinion gear 21 that is an output element of the slewing reduction gear and is disposed vertically on the upper end part 2a of the lower travelling body 2. The slewing force transmission mechanism is also provided with a ring gear 22 integrally formed on the circular outer peripheral surface of a slewing-side component part of the slewing bearing 3 that supports the boom swivel 5. (In FIG. 3, the shape of external teeth thereof is partially illustrated but the other portions thereof are omitted.) The ring gear 22 and the pinion gear 21 are meshed with each other, through which a slewing force is transmitted.

A boom slewing angle detection device 30, which detects a slewing angle of the crane boom 6, is provided with a slewing angle detecting gear 31, a slewing-angle-detecting proximity sensor 32, a limit switch 33 as a slewing storage position sensor, and a controller 34 mounted on the control panel 9 (see FIG. 1). The controller 34 and signal transmission paths (wired or wireless) are shown by one-dotted chain lines in FIG. 3. In addition, the slewing angle detecting gear 31, the slewing-angle-detecting proximity sensor 32 and the limit switch 33 are covered by a dust cover 35 that is attached to the upper end part 2a of the lower travelling body 2. The dust cover 35 is shown by two-dotted chain lines in FIG. 3.

The slewing angle detecting gear 31 is coaxially fixed to the upper-side shaft end that is one shaft end of the pinion gear 21 of the slewing force transmission mechanism so as to integrally rotate with the pinion gear. External teeth 31a for detection are formed at constant intervals on the outer peripheral surface of the slewing angle detecting gear 31.

The slewing-angle-detecting proximity sensor 32 is disposed at a position adjacent to the slewing angle detecting gear 31 in a direction along the outer periphery of the ring gear 22. The slewing-angle-detecting proximity sensor 32 is attached to the upper end part of an L-shaped mounting bracket 36 so as to horizontally orient toward the rotational center of the slewing angle detecting gear 31, the mounting bracket being fixed to the upper end part of the lower travelling body 2. The tip end face 32a of the sensor faces the external teeth 31a of the slewing angle detecting gear 31 across a minute interval. The slewing-angle-detecting proximity sensor 32 is an optical sensor, for example, and detects the external teeth 31a passing through the detection position thereof.

The limit switch 33, which is the slewing storage position sensor, is disposed adjacent to the slewing angle detecting gear 31 in a circumferential direction of the ring gear 22 and is at an opposite side to the slewing-angle-detecting proximity sensor 32.

The limit switch 33 detects the slewing storage position of the crane boom 6. The slewing storage position is a position at which the slewing angle of the crane boom 6 (the boom swivel 5) is zero degree, and the crane boom 6 is returned to and stored at the slewing storage position during travelling condition and the like.

A detecting ring 37 is coaxially attached to the boom swivel 5 at the upper side of the ring gear 22. The limit switch 33 has an operational rod 33a provided with an end roller, the end roller being pressed against the circular outer peripheral surface 37a of the detecting ring 37 in a direction toward the center of the circular outer peripheral surface by a predetermined elastic force. The circular outer peripheral surface 37a of the detecting ring 37 is formed with a V-shaped groove 37b, into which the end roller of the operational rod 33a is fitted in a direction toward the center of the ring when the boom swivel 5 slews to the slewing storage position. When the end roller is fitted into the V-shape groove 37b, the operational rod 33a of the limit switch 33 is operated to output a detection signal indicating the slewing storage position. A projection or other part may be disposed instead of the V-shaped groove 37b as a part detected by the limit switch 33.

The dust cover 35 is provided with: a horizontal top board portion 35a disposed along the upper edge of the circular outer peripheral surface 37a of the detecting ring 37 of the boom swivel 5; and a side board portion 35b extending vertically and downward from the both side edge parts and the outer peripheral side edge part of the top board portion 35a, but excluding from the inner peripheral side edge part thereof at the side of the detecting ring 37. The slewing angle detecting gear 31, the slewing-angle-detecting proximity sensor 32 and the limit switch 33 are covered by the dust cover 35 except for the inner peripheral side portions thereof facing toward the boom swivel 5, the dust cover being attached to the upper surface of the upper end part 2a of the lower travelling body 2.

Next, the controller 34 functions as a slewing amount calculation part 41, a slewing angle calculation part 42 and a slewing-angle zero-point adjustment part 43. The slewing amount calculation part 41 calculates the amount of slewing of the crane boom 6 based on the amount of rotation of the slewing angle detecting gear 31 detected by the slewing-angle-detecting proximity sensor 32, that is, the number of detected external teeth 31a for detection. The slewing angle calculation part 42 calculates the slewing angle of the crane boom 6 based on the calculated amount of slewing. The slewing angle is one that is from the slewing storage position at the time when the crane boom 6 starts to slew.

The slewing angle of the crane boom 6 is produced each time when the crane boom 6 is repeatedly slewed to perform working. If the calculated slewing angle includes errors, those errors are accumulated during the crane boom 6 is repeatedly slewed, which may lead to a detection error that cannot be ignored for safety. In this embodiment, when the crane boom 6 returns to the slewing storage position, the limit switch 33 as the slewing storage position sensor outputs a detection signal that indicates the slewing storage position at which the slewing angle is zero degree.

Upon receiving the detection signal, the slewing-angle zero-point adjustment part 43 of the controller 34 perform a zero-point adjustment of the slewing angle to reset the slewing angle, which has been obtained by the calculation so far, to be a zero degree. The reset of the slewing angle in this way makes it possible to delete errors and detect the slewing angle of the crane boom 6 accurately.

The invention claimed is:

1. A boom slewing angle detection device for a mobile crane to detect a slewing angle of a crane boom from a slewing storage position thereof, the boom slewing angle detection device by comprising:

a slewing angle detecting gear coaxially attached to a shaft end of a pinion gear so as to integrally rotate therewith, the pinion gear being an output element of a slewing reduction gear at a side of a lower travelling body of a mobile crane, the slewing reduction gear transmitting a slewing force to a ring gear attached to a side of the crane boom;

a slewing-angle-detecting proximity sensor to detect an amount of rotation of the slewing angle detecting gear;

a slewing storage position sensor to detect the slewing storage position of the crane boom; and a controller provided with: a slewing amount calculation part to calculate a slewing amount of the crane boom based on the amount of rotation detected by the slewing-angle-detecting proximity sensor; a slewing angle calculation part to calculate the slewing angle based on the slewing amount; and a slewing-angle zero-point adjustment part to reset the slewing angle to be zero degree when the slewing storage position sensor detects the slewing storage position, wherein the slewing-angle-detecting proximity sensor and the slewing storage position sensor are adjacently disposed at an outside of the ring gear along a direction of an outer peripheral surface of the ring gear in a manner sandwiching the slewing angle detecting gear; and the slewing angle detecting gear, the slewing-angle-detecting proximity sensor and the slewing storage position sensor are covered by a dust cover attached to the lower travelling body.

* * * * *